(12) United States Patent
Weisberg et al.

(10) Patent No.: US 10,080,325 B2
(45) Date of Patent: Sep. 25, 2018

(54) PREDICTIVE OVERLAP CONTROL MODEL

(71) Applicant: CNH Industrial America LLC, New Holland, PA (US)

(72) Inventors: Paul Gerhard Weisberg, Saskatoon (CA); John Stratton, Denver, CO (US); Anthony C. Rapley, Saskatoon (CA)

(73) Assignee: CNH Industrial America LLC, New Holland, PA (US)

( * ) Notice: Subject to any disclaimer, the term of this patent is extended or adjusted under 35 U.S.C. 154(b) by 122 days.

(21) Appl. No.: 14/924,130

(22) Filed: Oct. 27, 2015

(65) Prior Publication Data
US 2017/0112049 A1     Apr. 27, 2017

(51) Int. Cl.
*A01C 21/00* (2006.01)
*A01B 79/00* (2006.01)

(52) U.S. Cl.
CPC .......... *A01C 21/005* (2013.01); *A01B 79/005* (2013.01)

(58) Field of Classification Search
None
See application file for complete search history.

(56) References Cited

U.S. PATENT DOCUMENTS

| | | | |
|---|---|---|---|
| 4,967,362 A | 10/1990 | Schutten et al. | |
| 6,236,916 B1 | 5/2001 | Staub et al. | |
| 6,336,051 B1 | 1/2002 | Pangels et al. | |
| 6,678,580 B2 | 1/2004 | Benneweis | |
| 6,907,336 B2 | 6/2005 | Gray et al. | |
| 7,256,388 B2 | 8/2007 | Eglington et al. | |
| 7,640,107 B2 | 12/2009 | Shimizu et al. | |
| 8,186,288 B2 | 5/2012 | Chinkiwsky | |
| 8,190,337 B2 | 5/2012 | McClure et al. | |
| 8,191,795 B2 | 6/2012 | Grimm et al. | |
| 8,209,075 B2 | 6/2012 | Senneff et al. | |
| 8,494,726 B2 | 7/2013 | Peake et al. | |
| 8,523,085 B2 | 9/2013 | Grimm et al. | |

(Continued)

OTHER PUBLICATIONS

T. Oksanen and A. Visala, "Path Planning Algorithms for Agricultural Machines", Agricultural Engineering International: the CIGR Ejournal, Manuscript ATOE 07 009, vol. IX, Jul. 2007 (19 pages).

(Continued)

*Primary Examiner* — Mussa A Shaawat
*Assistant Examiner* — Kyung J Kim
(74) *Attorney, Agent, or Firm* — Rebecca L. Henkel; Rickard K. DeMille

(57) ABSTRACT

An overlap control system includes an agricultural vehicle control system operable to utilize a product delay (PD) value in seconds, a start early (SE) distance, and/or a stop late (SL) distance to determine at least one offset edge from a location of an agricultural implement. The agricultural vehicle control system is operable to look ahead along a guidance swath or at least one predicted path of the agricultural implement, and to determine that an intercept will occur between the at least one offset edge and a boundary along the guidance swath or predicted path. The agricultural vehicle control system is further operable to calculate a distance or time to the intercept, and to send a command to change an on/off state of the agricultural implement in the calculated distance or time.

14 Claims, 7 Drawing Sheets

(56) References Cited

U.S. PATENT DOCUMENTS

| | | |
|---|---|---|
| 8,676,466 B2 | 3/2014 | Mudalige |
| 2002/0099471 A1* | 7/2002 | Benneweis .......... A01B 79/005 |
| | | 700/237 |
| 2013/0184944 A1 | 7/2013 | Missotten et al. |
| 2014/0330479 A1 | 11/2014 | Dolgov et al. |
| 2016/0128270 A1* | 5/2016 | Ruppert ............. A01M 9/0053 |
| | | 239/68 |

OTHER PUBLICATIONS

Christophe Cariou, Roland Lenain, Benoit Thuilot and Philippe Martinet, "Autonomous Maneuver of a Farm Vehicle With a Trailed Implement: Motion Planner and Lateral-Longitudinal Controllers", Mar. 15, 2015 (6 pages).

* cited by examiner

PREDICTIVE OVERLAP CONTROL MODEL

BACKGROUND OF THE INVENTION

1. Field of the Invention

The present invention relates to a control system for agricultural implements, and more particularly to a control system that takes into account delays in turning on and off functions of the agricultural implements due to implement latency.

2. Description of the Related Art

Agricultural implements are commonly used to perform various agricultural functions, such as tilling, planting, spraying, and fertilizing. As modern farming methods have become more competitive, it has become increasingly important that fields and agricultural products to be applied to the fields are used efficiently. To this end, agricultural functions applied to the fields, whether such agricultural function is tillage, seeding, or application of fertilizer or other chemicals, are carefully controlled in order to prevent gaps where the agricultural function is not applied, or overlaps where the agricultural function is applied more than once.

In order to prevent this from happening, today's in-cab control systems accomplish overlap control using a centralized control system that commands an implement to "turn on now" or "turn off now" as the implement crosses a computed boundary, such as a boundary where the agricultural function has been performed before, or an edge boundary of the field. Such in-cab control systems use reactive models, so that the command is given when the boundary is crossed. Normally such systems are tied to GPS position information that is updated at a rate of 5 to 10 hertz, or 0.1 to 0.2 seconds between updates. At a typical sprayer speed of 25 miles per hour, for example, this can result in gaps or over-applications of 3½ to 7 feet. Further latency due to delays in software comparing the implement position to the boundary position, issuance of a command to the implement, and reaction to the command by the implement, particularly when the agricultural function has an inherent lag between actuators on the implement taking action and initiation or cessation of the agricultural function, can increase resultant gaps or over-applications considerably. Multiplied by the number of times that such boundaries are crossed in treating a given field, for example boundaries between rows and headland passes, these gaps or over-applications can add up to considerable wasted space or wasted agricultural resources.

In order to compensate for this, prior art systems have provided an operator the ability to program in a "start early" distance, a "stop late" distance, and a "product delay" time. The product delay represents the time between the system starting or stopping the agricultural implement and actual initiation or cessation of the agricultural function. Effectively, setting the product delay results in an offset of the reported location of the agricultural implement in the direction of travel of the agricultural implement. This new offset location is referred to as the product delay edge. The "start early" distance allowed for a further offset of the reported location of the agricultural implement in the direction of travel of the agricultural implement when transitioning from an overlap to a non-overlap area, i.e.—offset of the location of the agricultural implement toward the non-overlap area. This new offset location is referred to as the start early edge. The start early edge is used when initiating the agricultural function of the agricultural implement upon leaving the overlap area. The "stop late" distance allowed for a further offset of the reported location of the agricultural implement in the opposite direction to the direction of travel of the agricultural implement when transitioning from a non-overlap area to an overlap area, i.e.—offset of the location of the agricultural implement away from the overlap area. This new offset location is referred to as the stop late edge. The stop late edge is used when ceasing the agricultural function of the agricultural implement upon entering the overlap area. The "start early" and "stop late" distances allowed for fine-tuning of the performance of the agricultural implement after configuring the "product delay".

As each of the "start early" distance, "stop late" distance, and "product delay" time resulted in an offset of the reported location of the agricultural implement, the prior art systems still relied upon a "turn on now" or "turn off now" command sent to the agricultural implement when the reported location of the agricultural implement intercepted a boundary between a non-overlap area and an overlap area, or vice versa. Actual initiation or cessation of the agricultural function is still subject to variation as a result of changes in vehicle speed, vehicle heading, variations in central control system latency, and GPS position update frequency. As noted previously, the GPS position update frequency in particular can account for as much as 7 feet of variation, even with the reported location of the agricultural implement offset to compensate for system latency. Furthermore, in a centralized control system, multiple individual latencies of various agricultural implements had to be accounted for by reprogramming the "product delay" time to compensate.

What is needed in the art is a control model for preventing or minimizing gaps or over-applications of agricultural functions by agricultural implements, while not relying upon the rate at which GPS position information is updated, not being dependent upon latency due to delays in software, and taking into account the individual latency in the reaction times of various agricultural implements.

SUMMARY OF THE INVENTION

The present invention takes into account system and implement latency by utilizing a predictive model operating in a tractor control system that instructs an agricultural implement control system to "turn on/off in X feet" or to "turn on/off in X seconds." A dedicated agricultural implement control system may further calculate a distance or time in advance of the commanded distance or time based on the individual latency of that particular agricultural implement, represented by a product delay implement edge, at which advance time or distance the agricultural implement acts upon the command. Alternately, the dedicated agricultural implement control system may report the individual latency of that particular agricultural implement to the tractor control system, which calculates this latency into its "turn on/off in X feet" or "turn on/off in X seconds" commands. In this way, the actual initiation or cessation of the agricultural function takes place at the time or distance commanded, once the latent time or distance delay of the agricultural implement has elapsed.

Further, this allows the tractor control system to apply a standard calculation based on its own internal latencies, represented by the product delay edge, while relying upon the dedicated agricultural implement control systems to take into account differing latencies of various agricultural implements. This internal latency of the tractor control system may be significantly smaller than the latency of the agricultural implement, as it does not include the pure mechanical latencies of the agricultural implement. Meanwhile, the dedicated implement control system can keep track of the individual latency of the agricultural implement and calculate the advance time or distance accordingly, or provide the individual latency information to the tractor control system for it to use in making its calculations. Additionally, this arrangement improves accuracy when the ideal turn on/off point occurs between GPS cycle times.

The predictive algorithm used in the predictive model of the present invention may follow an auto-guidance swath in order to know where the tractor and agricultural implement are going, assuming that the autoguidance system stays engaged on the swath, in order to calculate the "turn on/off in X feet" or to "turn on/off in X seconds" commands. The predictive algorithm may alternately simply predict a likely path of the agricultural implement a number of seconds into the future, rather than relying on the auto-guidance swath, which number of seconds may be a function of the individual latency of the agricultural implement, for example two times the individual latency of the agricultural implement, or may be a preset value. The predictive algorithm may further take into account turns and extend or predict the turn based on position history. Additionally, the predicted likely path of the agricultural implement used to calculate the "turn on/off in X feet" or to "turn on/off in X seconds" commands may be chosen as a shortest potential distance when the agricultural implement is already in an overlapping area, and may be chosen as a longest potential distance when the agricultural implement is not currently in an overlapping area.

The present invention may be utilized on an agricultural implement that has individual implement sections that can be turned on and off, so that "turn on/off in X feet" or to "turn on/off in X seconds" commands are given for each section by the tractor control system. The dedicated implement control system can then apply the appropriate individual latency for each section in calculating the advance time or distance for that section. Further, the present invention may be utilized on a self-propelled agricultural implement, wherein the implement latency is incorporated directly into the product delay value.

The determination of when and where the agricultural implement, or individual implement sections of the agricultural implement, or the product delay edge, start early edge, stop late edge, or product delay implement edge thereof, will cross a boundary into or out of an area where the agricultural function has already been performed is accomplished using a calculation of colliding polygons. This is computationally intensive and requires computing resources. Therefore, once the determination that a boundary will be crossed and the time or distance to such boundary has been calculated, either using an auto-guidance swath or using a predicted likely path, the algorithm may conserve computing resources by only re-computing the time or distance if ground speed or bearing has changed.

The present invention may, in addition to boundaries representing field boundaries or automatically set boundaries resulting from previous application of the agricultural function, and in addition to product delay edges set by the tractor control system to compensate for latencies introduced by the central system, and in addition to product delay implement adjustments by the implement control system to compensate for the individual latencies of the agricultural implement, further allow an operator to set "start early" or "stop late" distances as before, in order to further fine tune the system. These are then integrated into the calculation providing the "turn on/off in X feet" or to "turn on/off in X seconds" commands given by the tractor control system.

Additionally, the present invention may allow an operator to fine tune the system by inputting an adjustment to be applied directly to the "turn on/off in X feet" or to "turn on/off in X seconds" commands.

The present invention may continue to give a redundant "turn on now" or "turn off now" command when the product delay edge set by the tractor control system, as modified by a "start early" or "stop late" distance if applicable, the "turn on/off in X feet" or to "turn on/off in X seconds" commands notwithstanding.

The invention in one form is directed to an overlap control system. The overlap control system includes an agricultural vehicle control system operable to utilize a product delay (PD) value in seconds, a start early (SE) distance, and/or a stop late (SL) distance to determine at least one offset edge from a location of an agricultural implement. The agricultural vehicle control system is operable to look ahead along a guidance swath or at least one predicted path of the agricultural implement, and to determine that an intercept will occur between the at least one offset edge and a boundary along the guidance swath or predicted path. The agricultural vehicle control system is further operable to calculate a distance or time to the intercept, and to send a command to change an on/off state of the agricultural implement in the calculated distance or time.

The invention in another form is directed to an implement control system associated with an agricultural implement. The implement control system is operable to receive a command to change an on/off state of the agricultural implement from an agricultural vehicle control system in a calculated time or distance. The implement control system is further operable to cause the calculated distance or time to be adjusted in order to compensate for latency delay of the agricultural implement in changing the on/off state.

The invention in another form is directed to a method of controlling an agricultural implement, including a series of steps. The first step is looking ahead along a guidance swath or at least one predicted path. The second step is determining that an intercept will occur along the guidance swath or at least one predicted path between an offset edge and a boundary. The offset edge is offset from a location of an agricultural implement on the basis of a product delay (PD) value in seconds, a start early (SE) distance, a stop late (SL) distance, and/or a product delay implement (PDI) value in seconds. The third step is calculating a distance or a time to the intercept, and the fourth step is sending a command to change an on/off state of the agricultural implement in the calculated distance or time.

An advantage of the present invention is that it saves on input costs associated with agricultural materials applied by agricultural implements, while increasing yields due to avoiding over or under application of these materials. Another advantage is that the invention does not rely on "start now" or "stop now" commands, which depend on the GPS update rate for accuracy. Instead, the invention allows the agricultural function being applied by the agricultural implement to initiate or cease exactly when the commanded time has elapsed or the commanded distance has been covered, which may potentially occur in between GPS updates.

A further advantage of the present invention is that it can be used with multiple agricultural implements with various individual known delay values between action being taken by the implement controls and initiation or cessation of the agricultural function. Finally, the present invention transfers the computational burden of the math associated with the implement latency to the implement control system.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
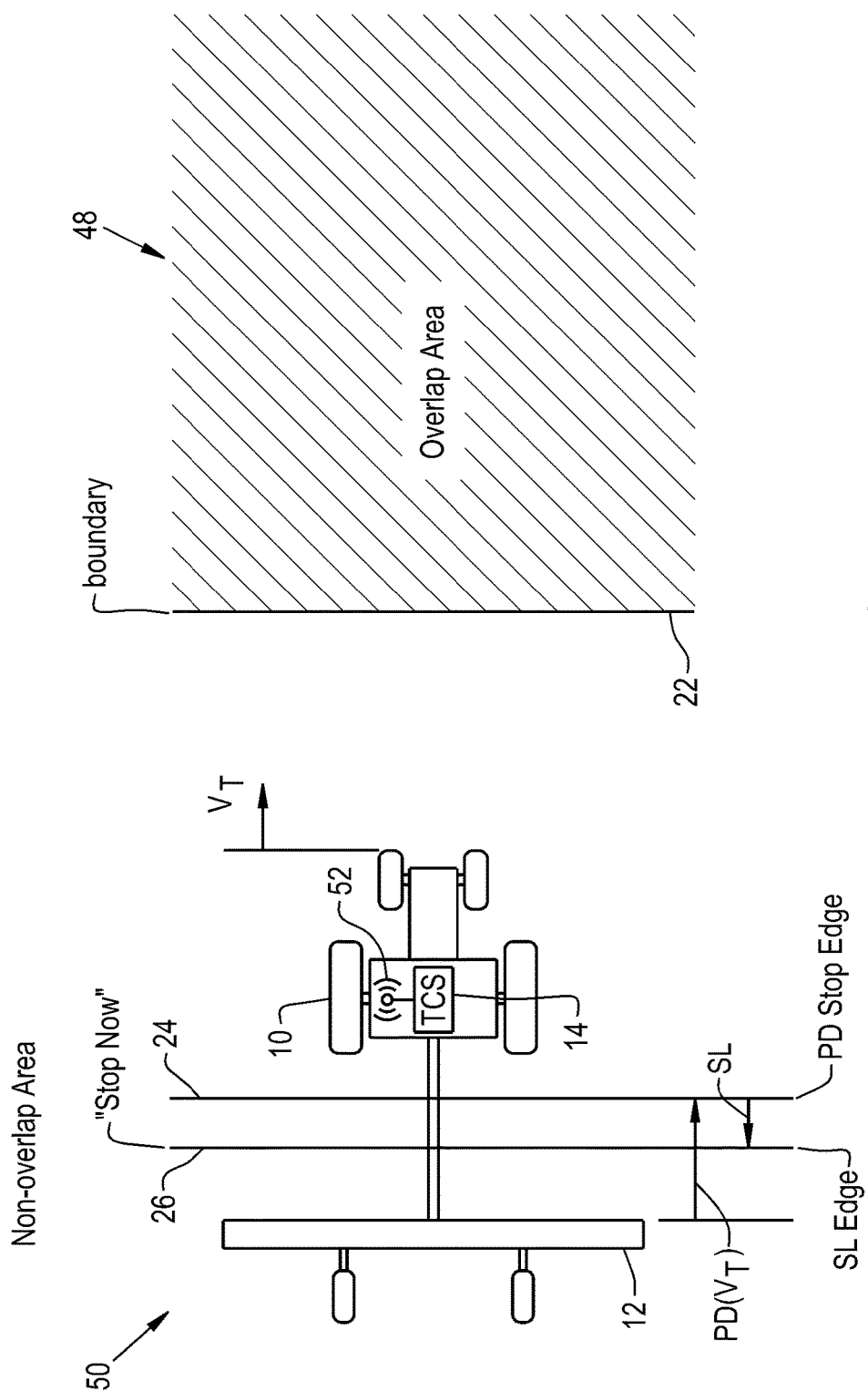
FIG. 1 is a graphical representation of a prior art overlap control model.
Figure 2:
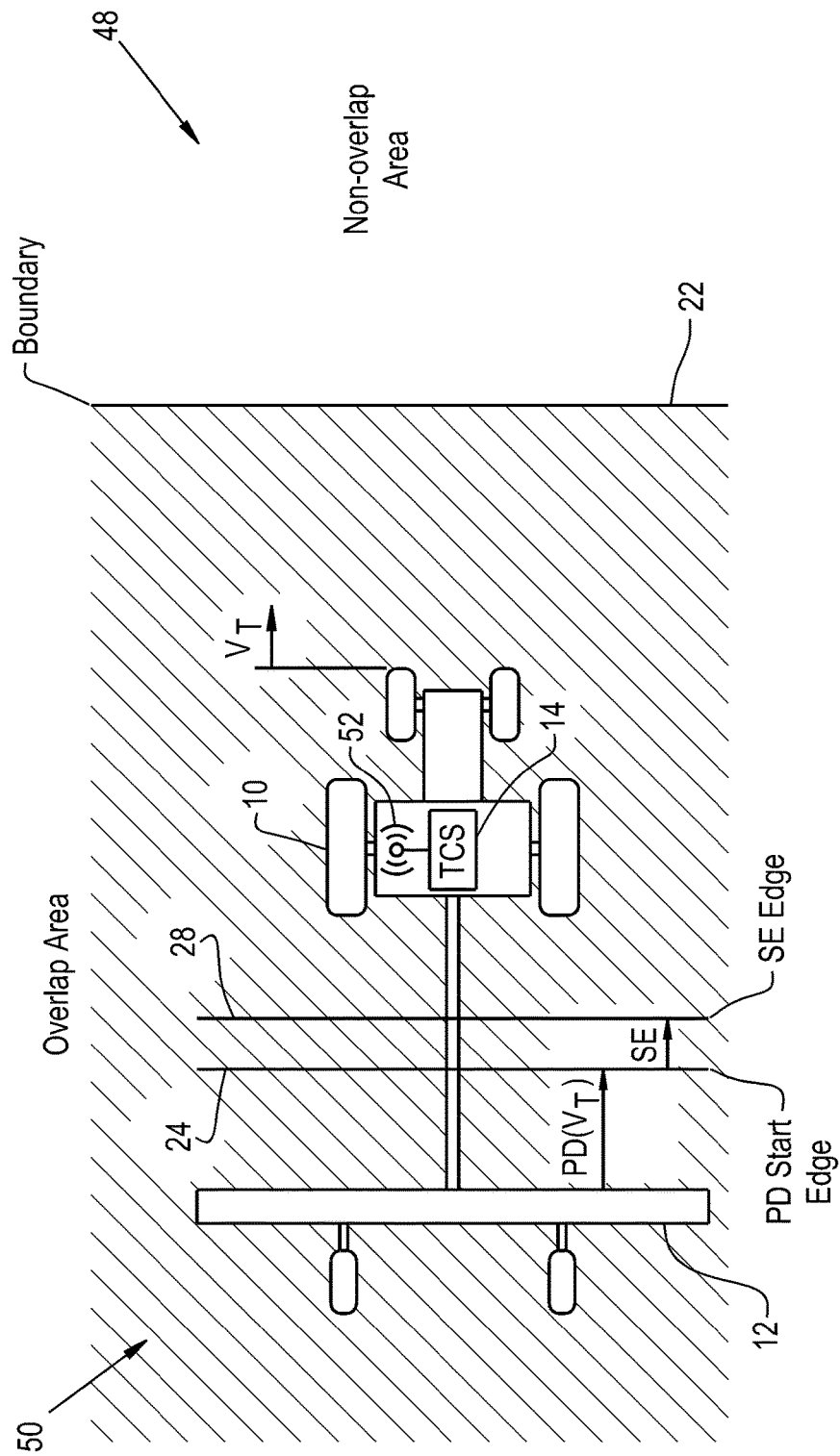
FIG. 2 is another graphical representation of the prior art overlap control model shown in FIG. 1.

Referring now to the drawings, and more particularly to FIGS. 1 and 2, there is shown a graphical representation of a prior art overlap control model. A tractor 10 pulling an agricultural implement 12 is in the process of moving from a non-overlap area 50 to an overlap area 48 in FIG. 1, and in the process of moving from an overlap area 48 to a non-overlap area 50 in FIG. 2. The non-overlap area 50 is separated from the overlap area 48 by a boundary 22, which may be a boundary of the field, or may be a boundary between an area where the agricultural function being performed by the agricultural implement 12 has not yet been performed, i.e.—the non-overlap area, and an area where the agricultural function being performed by the agricultural implement 12 has already been performed, i.e.—the overlap area.

Besides being a physical boundary, the boundary 22 is represented within a tractor control system 14 as geometric math data related to map information also residing within the tractor control system 14, in other words a virtual boundary. As the tractor 10 moves, a GPS receiver 52 provides the tractor control system 14 with position information that allows the tractor control system to determine the location of the tractor 10 and the agricultural implement 12, or in the case of a self-propelled agricultural implement, just the location of the implement itself.

In order to provide some compensation for overall system latency, the tractor control system 14 allows an operator to input a Product Delay value in seconds, which results in an offset of the reported location of the agricultural implement 12 in the direction of travel of the tractor 10, which offset location is called the Product Delay (PD) edge 24. The distance of this offset location may be a function of the actual tractor velocity ($V_T$), or may simply be a multiplication of the Product Delay value times an expected tractor velocity. The tractor control system 14 further allows the operator to input a Stop Late (SL) value in feet, which results in an offset of the reported location of the agricultural implement 12 opposite to the direction of travel of the tractor 10, which offset location is called the Stop Late edge 26. The Stop Late edge 26 is applicable when the tractor 10 is transitioning from a non-overlap area 50 to an overlap area 48 to delay the cessation of the agricultural function being performed by the agricultural implement 12 by that number of feet. Similarly, the tractor control system 14 further allows the operator to input a Start Early (SE) value in feet, which results in an offset of the reported location of the agricultural implement 12 in the direction of travel of the tractor 10, which offset location is called the Start Early edge 28. The Start Early edge 28 is applicable when the tractor 10 is transitioning from an overlap area 48 to a non-overlap area 50 to advance the initiation of the agricultural function being performed by the agricultural implement 12 by that number of feet.

The offsets represented by the Product Delay edge 24, the Stop Late edge 26, and the Start Early edge 28 are a way to allow the operator to attempt to further fine-tune the start or shutoff of the agricultural function being performed by the agricultural implement 12. Each of these offsets then resides within the tractor control system 14.

When the tractor control system 14 determines that the Stop Late edge 26, as adjusted from the actual location of the agricultural implement 12, has reached the boundary 22 when transitioning from the non-overlap area 50 to the overlap area 48, it sends a "stop now" command to the agricultural implement 12. Conversely, when the tractor control system 14 determines that the Start Early edge 28, as adjusted from the actual location of the agricultural implement 12, has reached the boundary 22 when transitioning from the overlap area 48 to the non-overlap area 50, it sends a "start now" command to the agricultural implement 12.

While the Product Delay edge 24, the Stop Late edge 26, and the Start Early edge 28 provide some compensation for overall system latency, cessation or initiation of application of the agricultural function being performed by the agricultural implement 12 at the correct time is still subject to changes in vehicle speed, vehicle heading, and variations in the system latency. Further, cessation or initiation of application of the agricultural function being performed by the agricultural implement 12 at the correct time is particularly susceptible to GPS position update frequency, as explained previously, and to the differences in individual latencies of various agricultural implements 12.

Figure 3A:
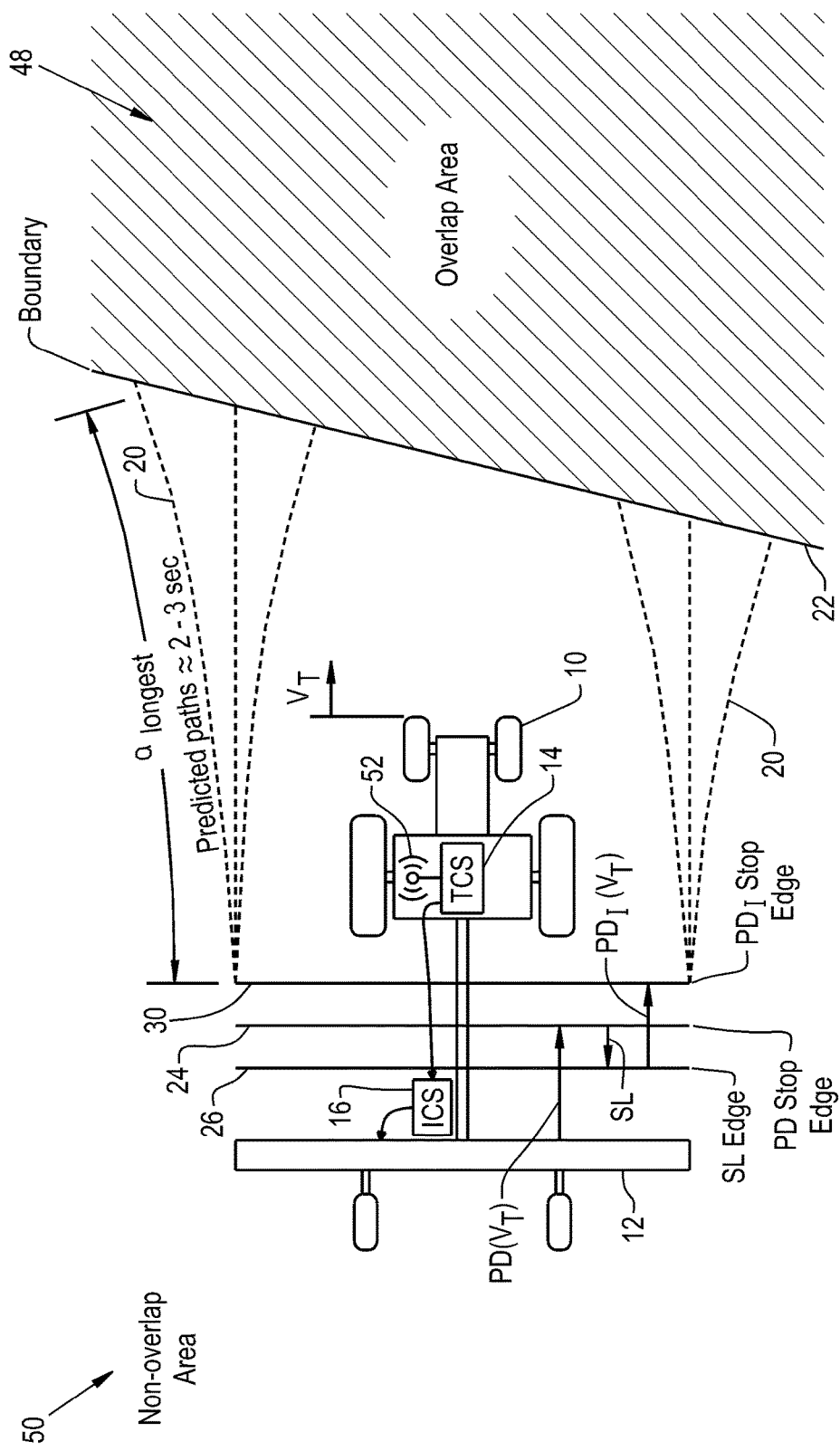
FIG. 3A is a graphical representation of an embodiment of the invention, being a predictive overlap control model.
Figure 4A:
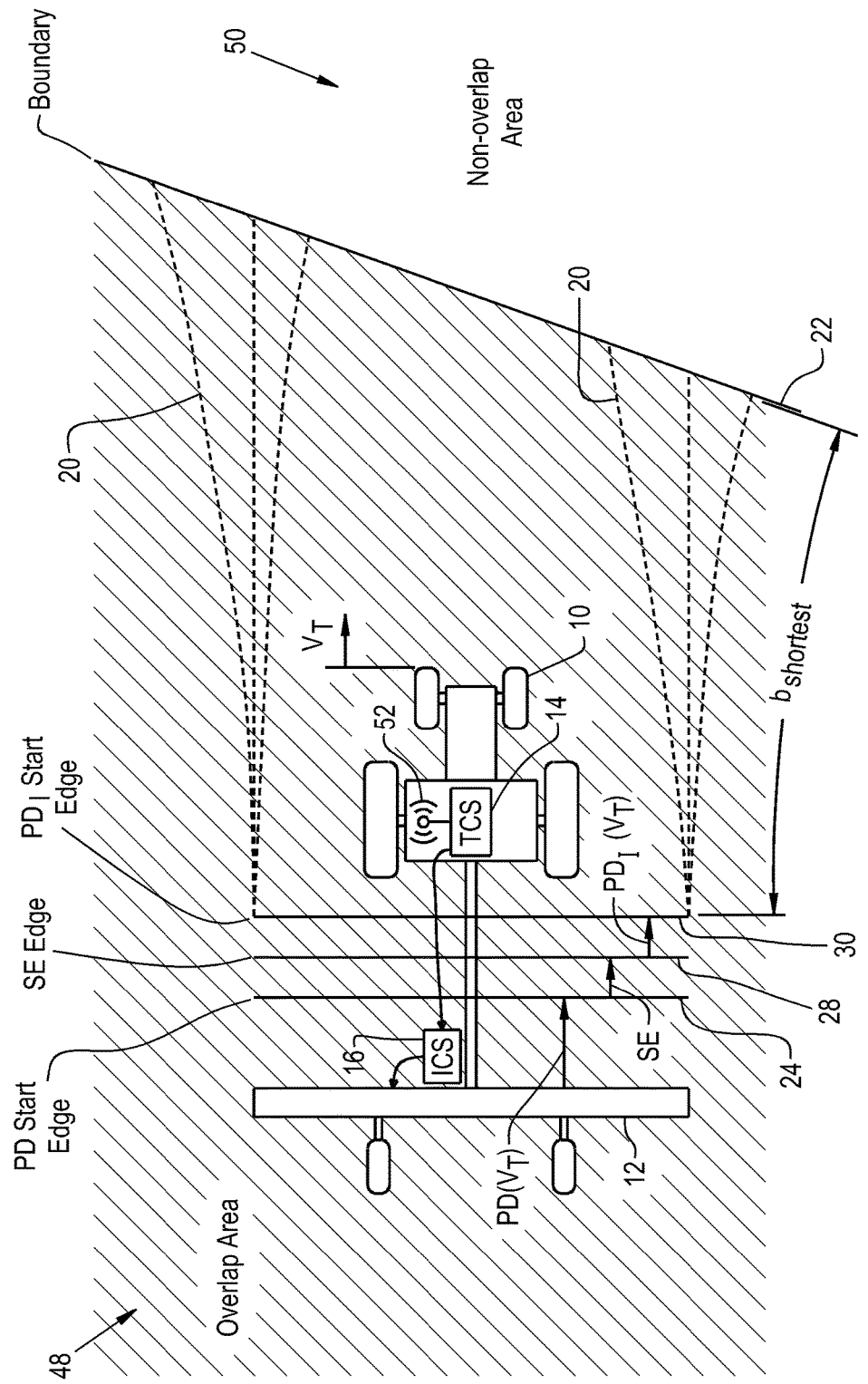
FIG. 4A is a graphical representation of another embodiment of the invention, also being a predictive overlap control model.

Turning now to FIGS. 3A and 4A, a graphical representation of an embodiment of a Predictive Overlap Control Model according to the present invention is provided. A tractor 10 pulling an agricultural implement 12 is again in the process of moving from a non-overlap area 50 to an overlap area 48 in FIG. 3A, and in the process of moving from an overlap area 48 to a non-overlap area 50 in FIG. 4A. The non-overlap area 50 is again separated from the overlap area 48 by a boundary 22, which is again represented within a tractor control system 14 as geometric math data related to map information also residing within the tractor control system 14. As the tractor 10 moves, a GPS receiver 52 again provides the tractor control system 14 with position information that allows the tractor control system to determine the location of the tractor 10 and the agricultural implement 12.

The tractor control system 14 in the present invention may still allow an operator to input, or may automatically determine, a Product Delay value that results in an offset of the reported location of the agricultural implement 12 in the direction of travel of the tractor 10 resulting in the Product Delay edge 24. The tractor control system 14 may also still allow the operator to input a Stop Late value that results in an offset of the reported location of the agricultural implement 12 opposite to the direction of travel of the tractor 10 resulting in the Stop Late edge 26. Similarly, the tractor control system 14 may still allow the operator to input a Start Early value that results in an offset of the reported location of the agricultural implement 12 in the direction of travel of the tractor 10 resulting in the Start Early edge 28. Each of these offsets still resides within the tractor control system 14. While the Stop Late edge 26 and Start Early edge 28 both still represent offsets in feet entered by the operator in order to fine tune the system if necessary, the Product Delay edge 24 of the present invention differs from the Product Delay edge of the prior art in that the time entered or automatically determined represents only the internal latencies of the tractor control system 14.

The implement control system 16 then calculates a further Product Delay Implement ($PD_I$) value in seconds that results in a further offset of the reported location of the agricultural implement 12 in the direction of travel of the tractor 10, resulting in the Product Delay Implement edge 30. The Product Delay Implement edge 30 is used in order to compensate for the individual latency of the agricultural implement 12. Note that the Product Delay Implement value is represented as a stop edge in FIGS. 3 and 4. However, it may or may not be a stop edge in the same sense as the Product Delay stop edge, the Stop Late edge, and the Start Early edge. That is to say, the adjustment to the commanded start and stop times and/or distances may only exist as the time and/or distance adjustment performed by the implement control system, instead of residing within the tractor control system 14 as another offset in the location of the agricultural implement 12 as determined by the GPS receiver 52.

Alternately, the Product Delay Implement value may be applied in both ways, so that the implement control system 16 applies an adjustment to commanded start and stop times and/or distances sent by the tractor control system 14, and represents the Product Delay Implement as a further stop edge offset from one of the regular Product Delay edge 24, the Stop Late edge 26, and the Start Early edge 28, as applicable. The implement control system 16 in this scenario further provides information regarding the latency of the agricultural implement 12 to the tractor control system 14, which then calculates a further offset Product Delay Implement edge as illustrated.

The present invention looks ahead along predicted paths 20 of the tractor 10 and agricultural implement 12 using a predictive algorithm 18 to determine a time and/or distance at which the Product Delay edge 24, Stop Late edge 26, Start Early edge 28, and/or Product Delay Implement Stop/Start edge 30, as applicable, as offset from the actual location of the agricultural implement 12, will intercept the boundary 22. The predicted paths 20 of the tractor 10 and agricultural implement 12 may be a portion of an auto-guidance swath provided by the tractor control system 14 along which the tractor 10 and agricultural implement 12 will move as guided by the GPS receiver 52. Alternately, the predicted paths 20 may be multiple predicted likely paths as determined by the predictive algorithm 18 based on current position, velocity, position history, previous turns, and driver inputs, as shown. The length to which the predicted paths 20 are calculated may be a function of the individual latency of the agricultural implement 12 as communicated to the tractor control system 14 by the implement control system 16, for example two times the individual latency of the agricultural implement 12, or may be a preset value.

The determination of the time and/or distance at which the Product Delay edge 24, Stop Late edge 26, Start Early edge 28, and/or Product Delay Implement Stop/Start edge 30, as applicable, as offset from the actual location of the agricultural implement 12, will intercept the boundary 22 is accomplished using a calculation of colliding polygons. Again, this operation is computationally intensive and requires computing resources. Therefore, once the determination that an edge will cross a boundary has been made and the time or distance to such boundary has been calculated, either using the auto-guidance swath or using a predicted likely path, the algorithm may conserve computing resources by only re-computing the time or distance if the ground speed or bearing of the tractor 10 and agricultural implement 12 has changed.

In the case of a tractor 10 and agricultural implement 12 transitioning from a non-overlap area 50 to an overlap area 48, the predicted path 20 used to actually calculate the time and/or distance at which the Product Delay edge 24, Stop Late edge 26, Start Early edge 28, and/or Product Delay Implement Stop/Start edge 30, as applicable, will intercept the boundary 22 may be a longest predicted path ($a_{longest}$) chosen from among a set of likely predicted paths 20. In the case of a tractor 10 and agricultural implement 12 transitioning from an overlap area 48 to a non-overlap area 50, the predicted path 20 used to actually calculate the time and/or distance at which the Product Delay edge 24, Stop Late edge 26, Start Early edge 28, and/or Product Delay Implement Stop/Start edge 30, as applicable, will intercept the boundary 22 may be a shortest predicted path ($b_{shortest}$) chosen from among a set of likely predicted paths 20.

Figure 3B:
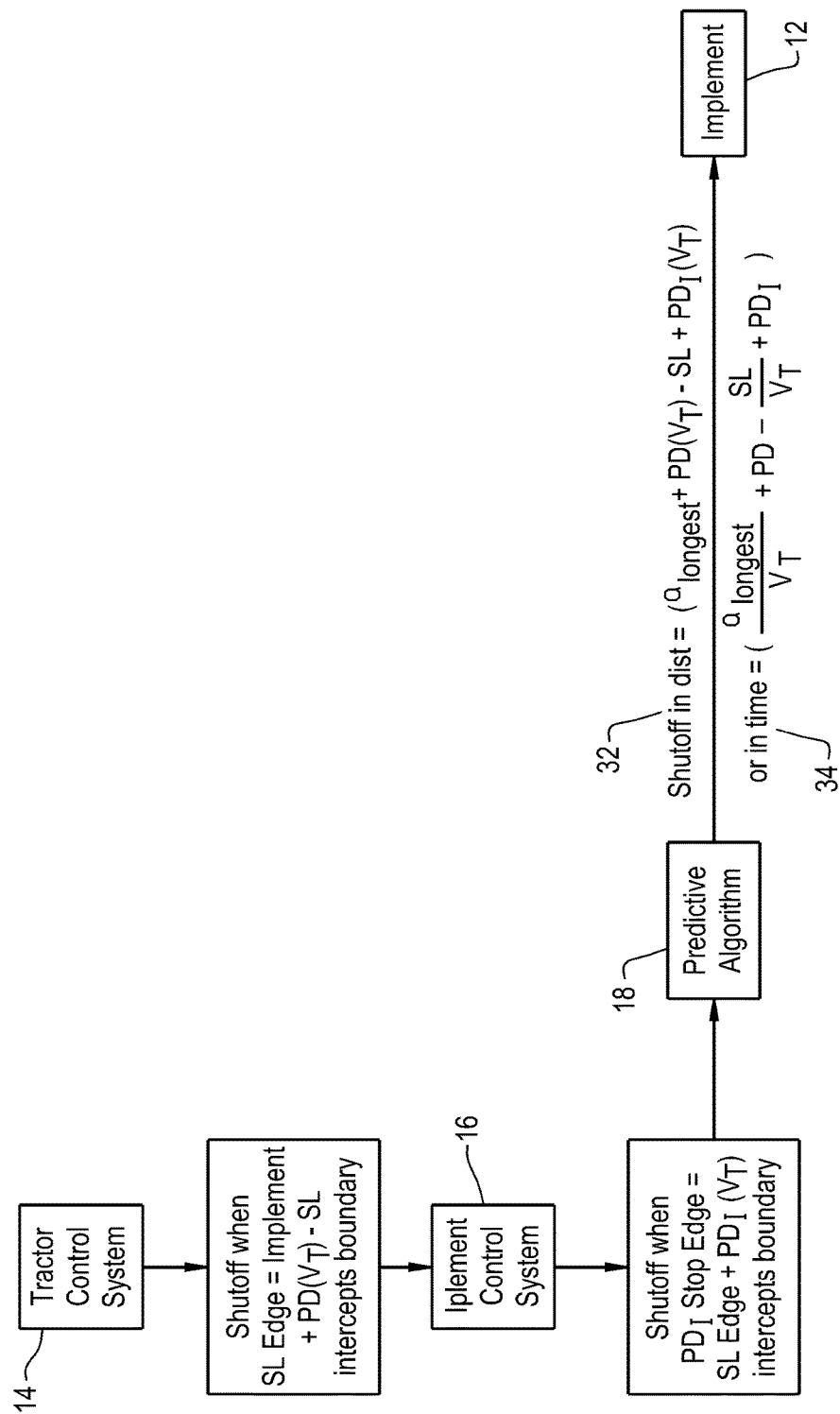
FIG. 3B is a flow chart showing the series of steps taken in the functioning of an embodiment of the invention.

In the case of a tractor 10 and agricultural implement 12 transitioning from a non-overlap area 50 to an overlap area 48 as shown in FIGS. 3A and 3B, once the predictive algorithm 18 has determined that the Product Delay edge 24, Stop Late edge 26, and/or Product Delay Implement edge 30, as applicable, will intercept the boundary 22, has chosen a longest predicted path ($a_{longest}$), and has calculated the time and/or distance at which the intercept will occur, the predictive algorithm 18 residing in the tractor control system 14 sends a commanded shutoff distance and/or a commanded shutoff time to the implement control system 16. The commanded shutoff distance 32 then equals ($a_{longest}$+ $PD(V_T)$−$SL$+$PD_I(V_T)$). The commanded shutoff time 34 equals (($a_{longest}$/$V_T$)+$PD$−($SL$/$V_T$)+$PD_I$). Alternately, in the embodiment wherein the implement control system 16 makes the final adjustment to account for its own latency, the tractor control system commanded shutoff distance equals ($a_{longest}$+$PD(V_T)$−$SL$) and the commanded shutoff time equals (($a_{longest}$/$V_T$)+$PD$−($SL$/$V_T$)). The implement control system 16 then adjusts the distance by adding $PD_I(V_T)$ or the time by adding $PD_I$.

Figure 4B:
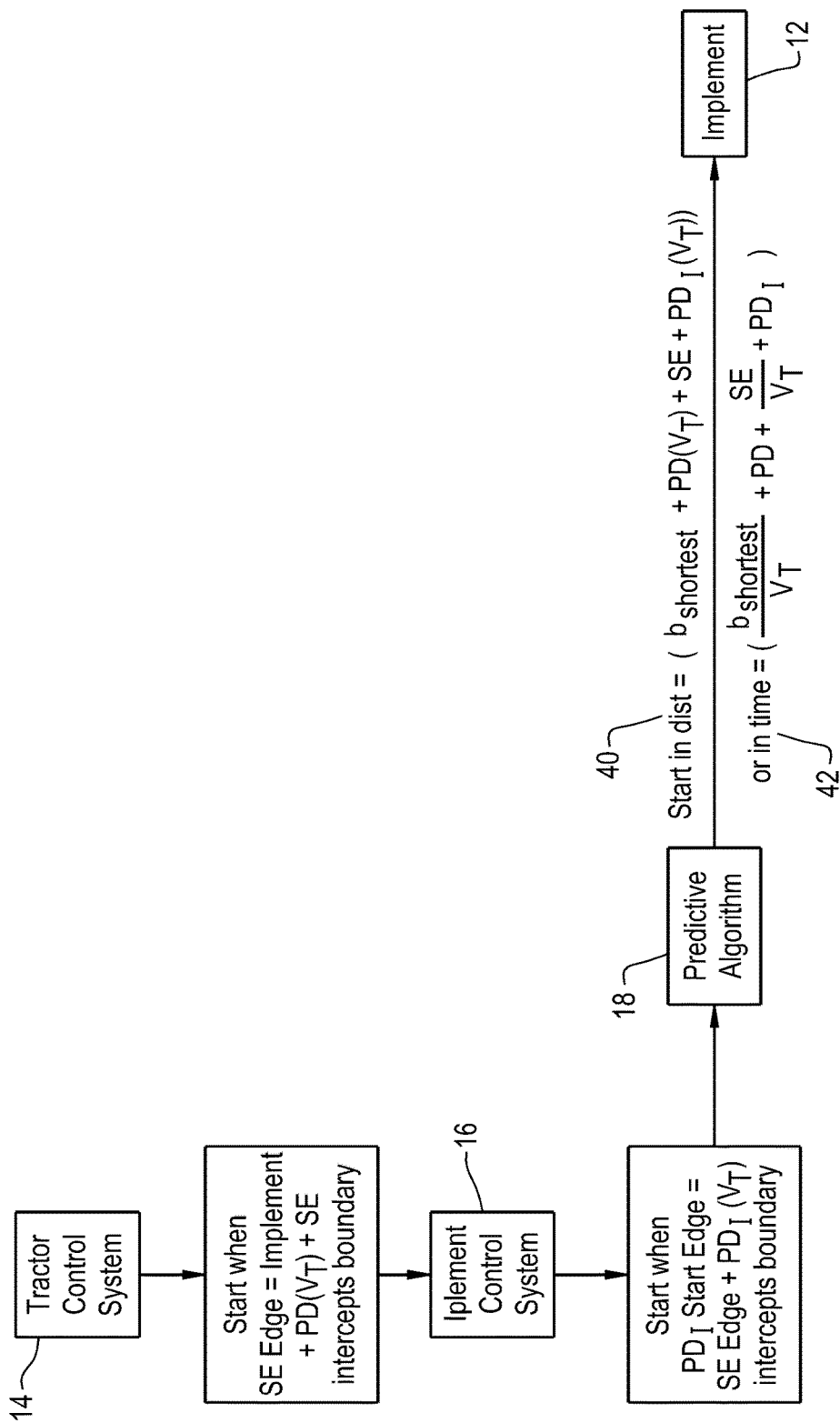
FIG. 4B is a flow chart showing the series of steps taken in the functioning of an embodiment of the invention.

In the case of a tractor 10 and agricultural implement 12 transitioning from an overlap area 48 to a non-overlap area 50 as shown in FIGS. 4A and 4B, once the predictive algorithm 18 has determined that the Product Delay edge 24, Start Early edge 28, and/or Product Delay Implement edge 30, as applicable, will intercept the boundary 22, has chosen a shortest predicted path, and has calculated the time and/or distance at which the intercept will occur, the predictive algorithm 18 residing in the tractor control system 14 sends a commanded start distance and/or a commanded start time to the implement control system 16. The commanded start distance 40 then equals ($b_{shortest}$+$PD(V_T)$+$SE$+$PD_I(V_T)$).

The commanded start time 42 equals $((b_{shortest}/V_T)+PD+(SE/V_T)+PD_I)$. Alternately, in the embodiment wherein the implement control system 16 makes the final adjustment to account for its own latency, the tractor control system commanded start distance equals $(b_{shortest}+PD(V_T)+SE)$ and the commanded start time equals $((b_{shortest}/V_T)+PD+(SE/V_T))$. The implement control system 16 then adjusts the distance by adding $PD_I(V_T)$ or the time by adding $PD_I$.

The entire process of determining that the Product Delay edge 24, Stop Late edge 26 Start Early edge 28, and/or Product Delay Implement edge 30, as applicable, will intercept a boundary 22, choosing a longest or shortest predicted path as appropriate, calculating the time and/or distance at which the intercept will occur by the tractor control system 14, and adjustment of the commanded start or stop time and/or distance by the implement control system 16, if applicable, is repeated on regular and frequent intervals, so that changes in vehicle speed and/or heading are accounted for.

A redundant "turn on now" or "turn off now" command may then be provided to the implement control system 16 by the tractor control system 14 based on the Product Delay edge 24, Stop Late edge 26 Start Early edge 28, and/or Product Delay Implement edge 30, as applicable, actually crossing the boundary 22 itself.

Finally, the implement control system 16 keeps track of the time elapsed and/or distance covered since the last commanded start distance 40 and/or commanded start time 42, or commanded shutoff distance 32 and/or commanded shutoff time 34 was received from the tractor control system 14, as adjusted according to its own individual latency if applicable, and takes the appropriate action when the adjusted time and/or distance has elapsed.

Figure 5:
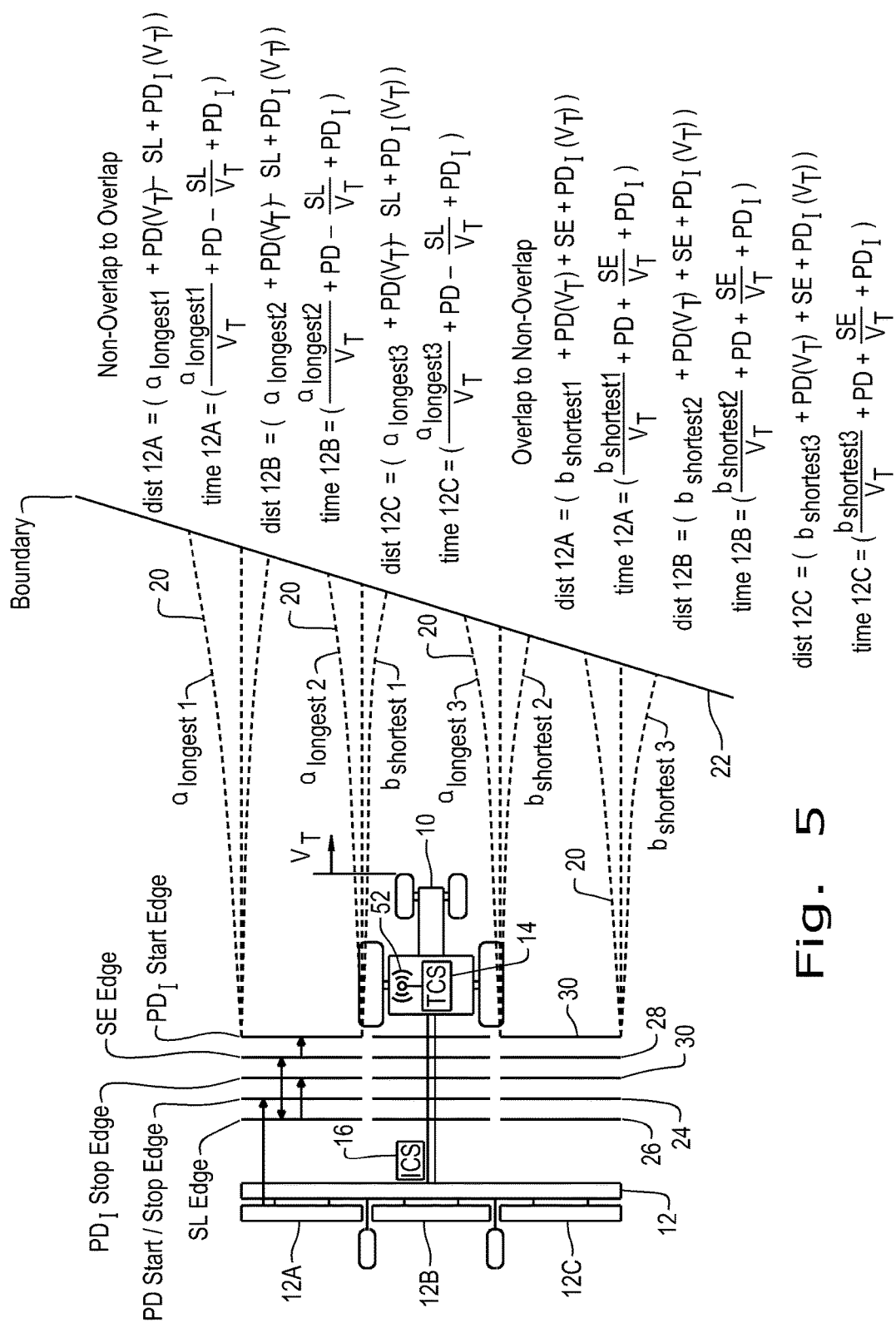
FIG. 5 is a graphical representation of another embodiment of the invention, also being a predictive overlap control model.

An additional embodiment of the present invention is illustrated in FIG. 5, again showing a tractor 10 pulling an agricultural implement 12 in the process of moving from a non-overlap area to an overlap area, or vice versa. The non-overlap area is again separated from the overlap area by a boundary 22. As the tractor 10 moves, a GPS receiver 52 again provides the tractor control system 14 with position information that allows the tractor control system to determine the location of the tractor 10 and the agricultural implement 12. In the arrangement shown in FIG. 5, the agricultural implement 12 is provided with three sections 12A, 12B, and 12C.

The process of determining that the Product Delay edge 24, Stop Late edge 26, Start Early edge 28, and/or Product Delay Implement edge, as applicable, will intercept a boundary 22, choosing a longest or shortest predicted path as appropriate, calculating the time and/or distance at which the intercept will occur by the tractor control system 14, and adjustment of the commanded start or stop time and/or distance by the implement control system 16 if applicable, is then duplicated for each of the sections 12A, 12B, and 12C of the agricultural implement 12. The redundant process of the tractor control system 14 providing a "turn on now" or "turn off now" command to the implement control system 16 based the Product Delay edge 24, the Stop Late edge 26, the Start Early edge 28, and/or the Product Delay Implement edge 30 actually crossing the boundary 22 itself, may also be performed for each of the sections 12A, 12B, and 12C of the agricultural implement 12.

Therefore, in the case of a tractor 10 and agricultural implement 12 transitioning from a non-overlap area to an overlap area, once the predictive algorithm 18 has determined that the Product Delay edge 24, Stop Late edge 26, and/or Product Delay Implement edge 30, as applicable, will intercept the boundary 22, has chosen a longest predicted path, and has calculated the time and/or distance at which the intercept will occur, the predictive algorithm 18 residing in the tractor control system 14 again sends a commanded shutoff distance 32 and/or a commanded shutoff time 34 to the implement control system 16. The commanded shutoff distance 32 for section 12A then equals $(a_{longest1}+PD(V_T)-SL+PD_I(V_T))$. The commanded shutoff time 34 for section 12A then equals $((a_{longest1}/V_T)+PD-(SL/V_T)+PD_I)$. The commanded shutoff distance 32 for section 12B then equals $(a_{longest2}+PD(V_T)-SL+PD_I(V_T))$. The commanded shutoff time 34 for section 12B then equals $((a_{longest2}/V_T)+PD-(SL/V_T)+PD_I)$. The commanded shutoff distance 32 for section 12C then equals $(a_{longest3}+PD(V_T)-SL+PD_I(V_T))$. The commanded shutoff time 34 for section 12C then equals $((a_{longest3}/V_T)+PD-(SL/V_T)+PD_I)$. As before, in the embodiment wherein the implement control system handles the adjustment for its own latency, the $PD_I(V_T)$ and $PD_I$ terms are instead added by the implement control system, rather than by the tractor control system.

In the case of a tractor 10 and agricultural implement 12 transitioning from an overlap area to a non-overlap area, once the predictive algorithm 18 has determined that the Product Delay edge 24, Start Early edge 28, and/or Product Delay Implement edge 30, as applicable, will intercept the boundary 22, has chosen a shortest predicted path, and has calculated the time and/or distance at which the intercept will occur, the predictive algorithm 18 residing in the tractor control system 14 sends a commanded start distance 40 and/or a commanded start time 42 to the implement control system 16. The commanded start distance 40 for section 12A then equals $(b_{shortest1}+PD(V_T)+SE+PD_I(V_T))$. The commanded start time 42 for section 12A then equals $((b_{shortest1}/V_T)+PD+(SE/V_T)+PD_I)$. The commanded start distance 40 for section 12B then equals $(b_{shortest2}+PD(V_T)+SE+PD_I(V_T))$. The commanded start time 42 for section 12B then equals $((b_{shortest2}/V_T)+PD+(SE/V_T)+PD_I)$. The commanded start distance 40 for section 12C then equals $(b_{shortest3}+PD(V_T)+SE+PD_I(V_T))$. The commanded start time 42 for section 12C then equals $((b_{shortest3}/V_T)+PD+(SE/V_T)+PD_I)$. As before, in the embodiment wherein the implement control system handles the adjustment for its own latency, the $PD_I(V_T)$ and $PD_I$ terms are instead added by the implement control system, rather than by the tractor control system.

In this way, as the intercept between the chosen predicted path and the applicable boundary is recalculated any time there is a change in vehicle speed or heading, accuracy is improved. Accuracy is further improved by the fact that the Predictive Overlap Control Model depends on a "turn on/off in X feet" or "turn on/off in X seconds" type of command, eliminating dependency on GPS position update frequency and the resultant inaccurate "turn on now" or "turn off now" commands. Finally, adjustment for tractor control system latency is separated from the adjustment for implement latency, which is now compensated for by the individual implement control system, which has better performance and can take into account the individual mechanical latency of that particular agricultural implement.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural overlap control system for a tractor and an agricultural implement configured to carry and deliver a product, the agricultural implement connected to and moved by the tractor to deliver the product, the agricultural overlap control system comprising:

an agricultural vehicle control system carried by the tractor and configured to communicate with the agricultural implement, the agricultural implement physically connected to the tractor, an agricultural implement control system carried by the agricultural implement, the agricultural vehicle control system in communication with the agricultural implement control system to control the agricultural implement, the agricultural vehicle control system operable to utilize at least two product delay (PD) values, a start early (SE) distance to determine at least a start early edge offset from a location of the agricultural implement, and a stop late (SL) distance to determine at least a stop late edge offset from a location of the agricultural implement;

said agricultural vehicle control system operable to look ahead of the agricultural implement using at least one edge offset along one of a guidance swath and at least one predicted path of the agricultural implement and further operable to determine that an intercept by the agricultural implement of an area of soil or crop which has already received the product via the agricultural implement (overlap area) will occur between said at least one edge offset and a boundary between a non-overlap area and the overlap area along said guidance swath or predicted path, said agricultural vehicle control system further operable to calculate at least one of a distance and a time to said intercept without reliance on GPS position updates, said agricultural vehicle control system further operable to send a command to change an on/off state of said agricultural implement in said calculated distance or time to the agricultural implement control system so that the agricultural implement delivers product to soil or crop and avoids re-delivery of product to the overlap area, wherein the agricultural implement control system determines at least one of the at least two product delay (PD) values for the agricultural implement via calculation of at least one of time and distance.

2. The agricultural overlap control system of claim 1, wherein:
the agricultural implement control systems is operable to utilize a product delay implement value in seconds to determine a further adjustment to said distance or time to said intercept.

3. The agricultural overlap control system of claim 2, wherein:
said agricultural vehicle control system uses said product delay implement value provided by said agricultural implement control system to determine a further edge offset, which is used to determine said further adjustment to said distance or time to said intercept.

4. The agricultural overlap control system of claim 1, wherein:
the distance that said agricultural vehicle control system looks ahead along said guidance swath or said predicted path to determine whether said intercept will occur is a function of a latency delay of said agricultural implement in changing said on/off state.

5. The agricultural overlap control system of claim 1, wherein:
said at least one predicted path is based on at least one of a current position, a current velocity, a position history, previous turns, and driver inputs.

6. The agricultural overlap control system of claim 1, wherein:
said distance or time to said intercept is calculated based on a predicted path to said intercept chosen from multiple potential predicted paths to said intercept.

7. The agricultural overlap control system of claim 6, wherein:
a longest potential predicted path to said intercept is chosen when transitioning from the non-overlap area to the overlap area.

8. The agricultural overlap control system of claim 6, wherein:
a shortest potential predicted path to said intercept is chosen when transitioning from the overlap area to the non-overlap area.

9. The agricultural overlap control system of claim 1, wherein:
said distance or time calculated to said intercept is recalculated only on a change in velocity or bearing.

10. The agricultural overlap control system of claim 1, wherein:
said distance or time calculated to said intercept is recalculated at regular intervals.

11. The agricultural overlap control system of claim 1, wherein:
the agricultural implement control system is operable to utilize a product delay implement value determined by the agricultural implement control center in seconds to determine a further offset edge; and
wherein said agricultural vehicle control system is further operable to calculate said distance to said intercept when transitioning from the non-overlap area to the overlap area, and wherein said agricultural vehicle control system is operable to calculate said distance from the overlap area to the non-overlap area when transitioning from the overlap area to the non-overlap area.

12. The agricultural overlap control system of claim 1, wherein:
the agricultural implement control system is operable to utilize a product delay implement value determined by the agricultural implement control system in seconds to determine a further edge offset; and
wherein said agricultural vehicle control system is further operable to calculate said time to said intercept when transitioning from the non-overlap area to the overlap area, and wherein said agricultural vehicle control system is operable to calculate said time from the overlap area to the non-overlap area when transitioning from the overlap area to the non-overlap area.

13. The agricultural overlap control system of claim 1, wherein:
said agricultural vehicle control system is operable to send a "start now" command to deliver product to the soil or the crop, and the agricultural vehicle control system is operable to send a "stop now" command to stop delivery of product to the soil or the crop, upon occurrence of said intercept.

14. The agricultural overlap control system of claim 1, wherein:

said agricultural implement includes at least two sections;

said agricultural vehicle control system being further operable to determine that intercepts will occur between at least one edge offset for each section of said agricultural implement and a boundary along a guidance swath or predicted path for each section of said agricultural implement, said agricultural vehicle control system further operable to calculate distances or times to said intercepts for each of said sections, said agricultural vehicle control system further operable to send commands to change on/off states of each of said sections of said agricultural implement in said calculated distances or times.

\* \* \* \* \*